United States Patent [19]
Isobe et al.

[11] Patent Number: 5,637,390
[45] Date of Patent: Jun. 10, 1997

[54] MAGNETIC RECORDING MEDIUM

[75] Inventors: Ryousuke Isobe; Takafumi Yanagita; Kazuyoshi Imai, all of Hino, Japan

[73] Assignee: Konica Corporation, Japan

[21] Appl. No.: 446,452

[22] Filed: May 22, 1995

Related U.S. Application Data

[63] Continuation of Ser. No. 46,442, Apr. 12, 1993, abandoned.

[30] Foreign Application Priority Data

Apr. 14, 1992 [JP] Japan ..................... 4-94584
Sep. 30, 1992 [JP] Japan ..................... 4-262037

[51] Int. Cl.$^6$ ..................... G11B 5/66; B32B 5/16
[52] U.S. Cl. ..................... 428/323; 428/328; 428/329; 428/330; 428/331; 428/403; 428/404; 428/405; 428/694 B; 428/694 BS; 428/694 BN; 428/694 BA; 428/694 BR; 428/900
[58] Field of Search ..................... 428/694 B, 694 BS, 428/694 BN, 694 BA, 900, 694 BR, 323, 328, 325, 330, 331, 403, 404, 405

[56] References Cited

U.S. PATENT DOCUMENTS

| | | | |
|---|---|---|---|
| 4,863,793 | 9/1989 | Ogawe et al. | 428/323 |
| 5,045,390 | 9/1991 | Isobe | 428/328 |
| 5,258,223 | 11/1993 | Inabe | 428/323 |

FOREIGN PATENT DOCUMENTS

| | | | |
|---|---|---|---|
| 442422 | 8/1991 | European Pat. Off. | G11B 5/708 |
| 0520155 | 12/1992 | European Pat. Off. | |
| 520155 | 12/1992 | European Pat. Off. | G11B 5/704 |

*Primary Examiner*—Leszek Kiliman, PHD
*Attorney, Agent, or Firm*—Jordan B. Bierman; Bierman, Muserlain and Lucas LLP

[57] ABSTRACT

A magnetic recording medium comprises a support, and provided thereon, a non-magnetic layer and an uppermost magnetic layer in that order, said non-magnetic layer containing an acicular non-magnetic powder, and said uppermost magnetic layer containing a ferromagnetic metal powder comprising Fe and Al.

14 Claims, 3 Drawing Sheets

MAGNETIC RECORDING MEDIUM

This application is a continuation of application Ser. No. 08/046,442, filed Apr. 12, 1993, now abandoned.

FIELD OF THE INVENTION

The present invention relates to a magnetic recording medium. More particularly, it relates to a magnetic recording medium suitable for digital recording mediums, having superior surface properties and superior electrical characteristics and runnability.

BACKGROUND OF THE INVENTION

Conventional magnetic recording mediums have been made higher in quality by making a magnetic powder finer, or by providing what is called a double-layer structure comprised of an upper layer which is a magnetic layer and a lower layer which is a non-magnetic layer [see Japanese Patent Publication Open to Public Inspection (hereinafter referred to as Japanese Patent O.P.I. Publication) No. 187418/1988 corresponding to U.S. Pat. No. 4,863,798].

However, in the former case and in the latter case, both, the dispersibility of magnetic powder or non-magnetic powder in a magnetic layer or non-magnetic layer forming coating composition can not be improved to cause a lowering of calenderability in a calandaring process. As a result, there arises such a problem that the surface properties of magnetic recording mediums can not be brought into a preferable state to make it difficult to obtain magnetic recording mediums having good electrical characteristics or runnability required for digital recording mediums.

SUMMARY OF THE INVENTION

An object of the present invention is to solve the above problem and provide a magnetic recording medium having superior electrical characteristics and runnability and suitable as a digital recording medium.

As a result of researches made by the present inventors to solve the problem, they have discovered that the surface properties of magnetic recording mediums can be improved to have a preferable state and superior electrical characteristics and runnability required for digital recording mediums can be achieved when a non-magnetic powder having a specific particle shape is used in the lower layer. Thus they have accomplished the present invention.

To achieve the above object, the present invention provides a magnetic recording medium comprising a support and provided thereon a lower layer part having a non-magnetic layer containing an acicular non-magnetic powder and an uppermost layer part comprised of a magnetic layer containing a ferromagnetic powder in this order.

DETAILED DESCRIPTION OF THE INVENTION

The magnetic recording medium of the present invention will be described below in detail.

Structure of Magnetic Recording Layer

The magnetic recording medium of the present invention comprises a non-magnetic support (A) and provided thereon a lower layer part (B) having at least one non-magnetic layer containing a non-magnetic powder and an uppermost layer part (C) comprised of a magnetic layer containing a ferromagnetic powder in this order. To describe more specifically, the magnetic recording medium of the present invention comprises a non-magnetic support (A) and provided thereon, a lower layer part (B) and an uppermost layer part (C) comprised of a magnetic layer in this order, where the lower layer part (B) has at least one non-magnetic layer containing a non-magnetic powder. The lower layer part may be formed of a plurality of non-magnetic layers or may be comprised of a plurality of layers having a magnetic layer and a non-magnetic layer. It is preferable to provide a non-magnetic layer just under the uppermost layer. As long as a non-magnetic layer is provided just under the uppermost layer, the order among other layers in the lower layer part is not limited.

(A) Non-magnetic Support

Materials that form the non-magnetic support may include, for example, polyesters such as polyethylene terephthalate and polyethylene-2,6-naphthalate, polyolefins such as polypropylene, cellulose derivatives such as cellulose triacetate and cellulose diacetate, and plastics such as polyamide and polycarbonate.

There are no particular limitation on the form of the non-magnetic support, mainly including the forms of a tape, a film, a sheet, a card, a disk and a drum.

There are no particular limitations on the thickness of the non-magnetic support. In the case of a film or a sheet, it may usually have a thickness of from 3 to 100 μm, and preferably from 4 to 50 μm; in the case of a disk or a card, a thickness of from about 30 μm to about 10 mm; and in the case of a drum, a thickness suitably selected according to the size of recorders or the like.

The non-magnetic support may have either a single layer structure or a multi-layer structure. The non-magnetic support may also be subjected to surface treatment such as corona discharging.

On the side of the non-magnetic support on which the magnetic layer is not provided (i.e., the back), a back coat layer may preferably be provided for the purposes of improving runnability of the magnetic recording medium, preventing static charges and preventing transfer. A subbing layer may also be provided between the lower layer part (B) and the non-magnetic support.

(B) Lower Layer Part (B-1) Description of Lower Layer Part

There are no particular limitations on the lower layer part except that it has at least one non-magnetic layer containing a non-magnetic powder. The lower layer part can be formed by various methods. The lower layer part may be formed in a single layer or plural layers on the non-magnetic support. It may preferably be formed in a single layer which is a non-magnetic layer.

(B-2) Composition of Non-magnetic Layer

The non-magnetic layer contains a non-magnetic powder. This non-magnetic layer may also contain a binder and other components.

(B-2-1) Non-magnetic Powder

In the present invention, the non-magnetic powder to be used may be appropriately selected from various known non-magnetic powders.

Usable non-magnetic powders can be exemplified by carbon black, graphite, $TiO_2$, barium sulfate, ZnS, $MgCO_3$, CaCO₃, ZnO, CaO, tungsten disulfide, molybdenum disulfide, boron nitride, MgO, $SnO_2$, $SiO_2$, $Cr_2O_3$, $\alpha$-$Al_2O_3$, $\alpha$-$Fe_2O_3$, $\alpha$-FeOOH, SiC, cerium oxide, corundum, artificial diamond, $\alpha$-iron oxide, garnet, silica, silicon nitride, silicon carbide, molybdenum carbide, boron carbide, tungsten carbide, titanium carbide, tripoli, diatomaceous earth and dolomite.

Of these, inorganic powders such as carbon black, $CaCO_3$, $TiO_2$, barium sulfate, $\alpha$-$Al_2O_3$, $\alpha$-$Fe_2O_3$, $\alpha$-FeOOH and $Cr_2O_3$ are preferred. Polymer powders such as polyethylene powder also are preferred.

In the present invention, a non-magnetic powder whose particle shape is acicular is used. Use of the acicular non-magnetic powder makes it possible to improve the smoothness of the surface of the non-magnetic layer, so that the smoothness of the surface of the uppermost layer laminated thereto, comprised of a magnetic layer, can be improved. In this regard, its use is preferred.

The non-magnetic powder of the invention has an average major axis length of 0.50 μm or less, preferably 0.40 μm or less, and more preferably 0.30 μm or less. The non-magnetic powder of the invention has an average minor axis length of 0.10 μm or less, preferably 0.08 μm or less, and more preferably 0.06 μm or less. The axial ratio of the average major axis length to the average minor axis length is 2 to 20, preferably 5 to 15, and more preferably 5 to 10. The axial ratio herein referred to is meant to be the ratio of an average major axis length to an average minor axis length of the non-magnetic powder (average major axis length/average minor axis length).

The above average major axis length is an average value of the average major axis lengths of 500 non-magnetic powder particles measured on an electron microscope photograph. The axial ratio is obtained from the average major axis length and average minor axis length of 500 non-magnetic powder particles measured on an electron microscope photograph. In the present invention, the plural acicular non-magnetic powders different in the kinds and the average major axis length from each other may be used. The non-magnetic powder other than the acicular non-magnetic powder of the invention may be used in combination so long as the object of the invention is achieved.

The non-magnetic powder may comprise particles having a specific surface area of usually from 10 to 250 m²/g, preferably from 20 to 150 m²/g, and particularly preferably from 30 to 100 m²/g.

Use of the non-magnetic powder comprising the particles having the major axis length, minor axis length, axial ratio and specific surface area that fall within the above ranges can bring about good surface properties of the non-magnetic layer and also can bring into a good state the surface of the uppermost layer comprised of a magnetic layer. In this regard, its use is preferred.

In the present invention, the orientation percentage of the acicular non-magnetic powder in the non-magnetic layer preferably is not less than 40%. The orientation percentage of the acicular non-magnetic powder in that layer at its cross section parallel to the direction of tape run and perpendicular to the surface of the non-magnetic support more preferably is not less than 50%. The orientation percentage of the non-magnetic powder in that layer at its like cross section still more preferably is not less than 60%. The non-magnetic layer can be smooth, can have a high packing density and can achieve a high calenderability when the stated orientation percentage is not less than 40%, in other words, the acicular non-magnetic powder is oriented in the longitudinal direction in a proportion of 40% or more, in particular, in a proportion of 50%.

When satisfying the above range of the orientation, runnability at a low temperature is improved.

The orientation percentage is herein meant to be the proportion of the acicular non-magnetic powder oriented in the direction of −45° to 45°, to the whole acicular non-magnetic powder.

In order to control the orientation percentage so as to be not less than 40%, a non-magnetic layer coating composition should be applied to the non-magnetic support in such a way that a force is applied to a non-magnetic layer coating in the longitudinal direction of the non-magnetic support while adjusting the distance between the non-magnetic support and a coater die, coating speed, and the pressure at which the non-magnetic support is pressed against the coater die.

Herein the orientation percentage can be determined in the following way.

(Orientation Percentage Measuring Method-1)

The surface of a magnetic layer of the magnetic recording medium is abraded to remove the magnetic layer so that the non-magnetic layer is uncovered. The surface of the non-magnetic layer is observed using a scanning electron microscope to take a photograph. This photograph is processed on an image analyzer. The part at which the observation has been made is changed so that photographs on at least ten visual fields are similarly processed to determine orientation distribution.

(Orientation Percentage Measuring Method-1)

Alternatively, when the orientation percentage of the non-magnetic powder in the layer at its cross section parallel to the direction of tape run and perpendicular to the surface of the non-magnetic support is determined, a tape-like magnetic recording medium is embedded and set stationary in an embedding resin for electron microscopes, and then an ultra-thin section whose cross section perpendicular to the tape surface parallel to the direction of tape run has been uncovered is prepared using a microtome. The ultra-thin section thus obtained is placed on a Cu grid mesh and observed using a 200 kV transmission electron microscope to take a photograph on a suitable visual field. The photograph obtained is processed on an image analyzer. The part at which the photograph has been taken is changed so that photographs on at least ten visual fields are similarly processed to determine orientation distribution.

A method of measuring the orientation percentage will be described below.

In a region defined around an arbitrary point P on the object specimen, a standard deviation $S(\theta)$ of picture element values of the whole region is given by the following expression (Expression 1).

Expression 1

$$S(\theta) = \left[ 1/A \sum_{i=1}^{n} dAi(\theta)\{\mu i(\theta) - \bar{\mu}(\theta)\}^2 \right]^{1/2}$$

wherein $\bar{\mu}(\theta)$ is a mean value of the values of picture elements in the whole object circle; A is picture elements in the object circle; $dAi(\theta)$ is picture elements of an i-th piece; and $\mu i(\theta)$ is a mean value of the values of the i-th piece.

If many particles are oriented, the difference in standard deviation between that direction and other direction is considered to become greater. Accordingly, differences between the above $S(\theta)$ and the standard deviation in the direction of measurement are taken and summed up to give $G1(\theta)$. $G1(\theta)$ is shown by the following expression (Expression 2). This is standardized, and regarded as orientation percentage with respect to each direction.

Expression 2

$$G1(\theta) = \sum_{m=1}^{k} \frac{S(\theta) - S(\theta + m\Delta\theta)}{\bar{\mu}(\theta)}$$

Details concerning the orientation percentage are described in "Development of Method for Measurement of Fiber Orientation in Fiber Reinforced Plastics", Koyto Kogei Sen'i University, Yasunori Hamada, Nippon Sen'i Kikai Gakkai The 41st Annual Meeting (Jun. 9, 1988).

In the present invention, the non-magnetic powder described above may preferably having been surface-treated with a silicon compound (Si) and/or an aluminum compound (Al). Use of the non-magnetic powder having been thus surface-treated can bring into a good state the surface of the uppermost layer comprised of a magnetic layer. As to the content of the Si and/or Al, Si may preferably be in a content of from 0.1 to 50% by weight and Al from 0.1 to 50% by weight, based on the weight of the non-magnetic powder. More preferably Si may be in a content of from 0.1 to 10% by weight and Al from 0.1 to 10% by weight, and still more preferably Si from 0.1 to 5% by weight and Al from 0.1 to 5% by weight. Most preferably Si may be in a content of from 0.1 to 2% by weight and Al from 0.1 to 2% by weight. The surface treatment can be carried out by the method disclosed in Japanese Patent O.P.I. Publication No. 83219/1990.

The non-magnetic powder described above may be contained in the non-magnetic layer in an amount from 50 to 99% by weight, preferably from 60 to 95% by weight, and particularly preferably from 70 to 95% by weight, based on the total weight of all components constituting the non-magnetic layer. Use of the non-magnetic powder in the amount falling under the above range can bring into a good state the surface of the uppermost layer comprised of a magnetic layer. In this regard, such use is preferred.

(B-2-2) Binder

The binder used in the non-magnetic layer is typically exemplified by polyurethane, polyester and vinyl chloride resins such as vinyl chloride copolymers. These resins may preferably contain a repeating unit having at least one polar group selected from $-SO_3M$, $-OSO_3M$, $-COOM$ and $-PO(OM^1)_2$.

In the above polar groups, M represents a hydrogen atom or an alkali metal such as Na, K or Li, and $M^1$ represents a hydrogen atom, an alkali metal such as Na, K or Li, or an alkyl group.

The polar group has the action of improving dispersibility of non-magnetic powder, and may be contained in each resin in a proportion of from 0.1 to 8.0 mol %, and preferably from 0.2 to 6.0 mol %. The resins may each have a weight average molecular weight in the range from 15,000 to 50,000.

The binder in the non-magnetic layer containing the non-magnetic powder may usually be contained in an amount of from 5 to 40 parts by weight, and preferably from 10 to 30 parts by weight, based on 100 parts by weight of the non-magnetic powder.

The binder may not necessarily be used alone, and may be used in combination of two or more kinds. In this case, the ratio of polyurethane and/or polyester to vinyl chloride resin may be used in the range of from 90:10 to 10:90, and preferably from 70:30 to 30:70, in weight ratio.

The polar group-containing vinyl chloride copolymer used as the binder in the present invention can be synthesized, for example, by addition reaction of a hydroxyl group-containing copolymer such as a vinyl chloride/vinyl alcohol copolymer with the following compound having a polar group and a chlorine atom. $Cl-CH_2CH_2SO_3M$, $Cl-CH_2CH_2OSO_3M$, $Cl-CH_2COOM$, or $Cl-CH_2-P(=O)(OM^1)_2$.

Taking $Cl-CH_2CH_2SO_3Na$ as an example from these compounds, the reaction described above proceeds as shown below:

The polar group-containing vinyl chloride copolymer can also be obtained by charging a given amount of reactive monomers having an unsaturated bond into which the repeating unit having the polar group is introduced, in a reaction vessel such as an autoclave to carry out polymerization reaction in the presence of a commonly available polymerization initiator as exemplified by a radical polymerization initiator such as BPO (benzoyl peroxide) and AIBN (azobisisobutyronitrile), a redox polymerization initiator or a cationic polymerization initiator.

Reactive monomers for introducing sulfonic acid or a salt thereof may specifically include unsaturated hydrocarbon sulfonic acids such as vinyl sulfonic acid, allylsulfonic acid, methacrylosulfonic acid and p-styrene sulfonic acid, and salts thereof.

When carboxylic acid or a salt thereof is introduced, for example, acrylic or methacrylic acid or maleic acid may be used. When phosphoric acid of a salt thereof is introduced, for example, acrylic or methacrylic acid-2-phosphate may be used.

Into the vinyl chloride copolymer, an epoxy group may preferably have been introduced. Introduction thereof brings about an improvement in thermal stability of the polymer.

When the epoxy group is introduced, repeating units containing the epoxy group may preferably be contained in the copolymer in a proportion of from 1 to 30 mol %, and more preferably from 1 to 20 mol %.

Monomers used to introduce the epoxy group preferably include, for example, glycidyl acrylate.

Techniques for introducing polar groups into vinyl chloride copolymers are disclosed in Japanese Patent O.P.I. Publication No. 44227/1982, No. 108052/1983, No. 8127/1984, No. 101161/1985, No. 235814/1985, No. 238306/1985, No. 238371/1985, No. 121923/19887, No. 146432/1985 and No. 146433/1985, etc. These techniques can be applied also to the present invention.

Syntheses of the polyester and polyurethane used in the present invention will be described below.

Polyesters are usually obtained by reacting a polyol with a polybasic acid.

Using this known method, the polyester (polyol) having the polar group can be synthesized from a polyol and a polybasic acid having the polar group in part.

The polybasic acid having the polar group can be exemplified by 5-sulfoisophthalic acid, 2-sulfoisophthalic acid, 4-sulfoisophthalic acid, 3-sulfoisophthalic acid, a dialkyl 5-sulfoisophthalate, a dialkyl 2-sulfoisophthalate, a dialkyl 4-sulfoisophthalate, a dialkyl 3-sulfoisophthalate, and sodium salts or potassium salts of these.

The polyol can be exemplified by trimethylolpropane, hexanetriol, glycerol, trimethylolethane, neopentyl glycol, pentaerythritol, ethylene glycol, propylene glycol, 1,3-butanediol, 1,4-butanediol, 1,6-hexanediol, diethylene glycol and cyclohexanedimethanol.

Polyesters into which other polar group has been introduced can also be synthesized by known methods.

The polyurethane will be described below.

This is obtained by reacting a polyol with a polyisocyanate.

As the polyol, polyester polyols obtained by reacting polyols with polybasic acids are usually used.

Hence, the polyurethane having the polar group can be synthesized by using as a starting material a polyester polyol having the polar group.

The polyisocyanate can be exemplified by diphenylmethane-4,4'-diisocyanate (MDI), hexamethylene diisocyante (HMDI), tolylene diisocyanate (TDI), 1,5-natphthalene diisocyanate (NDI), tolidine diisocyanate (TODI) and lidine isocyanate methyl ester (LDI).

Addition reaction of a polyurethane having a hydroxyl group with the following compound having the polar group and a chlorine atom is also effective as other method for synthesizing the polyurethane having the polar group.
$Cl—CH_2CH_2SO_3M$, $Cl—CH_2CH_2OSO_3M$, $Cl—CH_2COOM$, or $Cl—CH_2—P(=O)(OM^1)_2$.

Techniques for introducing polar groups into polyurethanes are disclosed in Japanese Patent Examined Publication No. 41565/1983, Japanese Patent O.P.I. Publication No. 92422/1982, No. 924243//1982, No. 8127/1984, No. 5423/1984, No. 5424/1984 and No. 121923/1987, etc. These techniques can be applied also to the present invention.

In the present invention, the following resin may be used as the binder in combination in an amount of not more than 20% by weight based on the total weight of the binder.

The resin may include a vinyl chloride/vinyl acetate copolymer, a vinyl chloride/vinylidene chloride copolymer, a vinyl chloride/acrylonitrile copolymer, a butadiene/acrylonitrile copolymer, polyamide resins, polyvinyl butyral, cellulose derivatives such as nitrocellulose, a styrene/butadiene copolymer, phenol resins, epoxy resins, urea resins, melamine resins, phenoxy resins, silicone resins, acrylic resins, urea formamide resins and all sorts of synthetic rubber type resins, having a weight average molecular weight of from 10,000 to 200,000.

(B-2-3) Other Components

In the present invention, additives such as an abrasive, a lubricant, a durability improver, a dispersant, an antistatic agent and a filler may be contained in the lower layer part so that its quality can be improved.

As the abrasive, materials known in themselves can be used.

The abrasive may usually have an average particle diameter of from 0.05 to 0.6 µm, preferably from 0.05 to 0.5 µm, and particularly preferably from 0.05 to 0.3 µm.

The abrasive may usually be contained in the lower layer part in an amount of from 3 to 20 parts by weight, preferably from 5 to 15 parts by weight, and particularly preferably from 5 to 10 parts by weight, based on 100 parts by weight of acicular non-magnetic powders in a non-magnetic layer.

These additives may be used as the non-magnetic powders.

As the lubricant, fatty acids and/or fatty acid esters can be used. In this case, the fatty acid may preferably be added in an amount of from 0.2 to 10% by weight, and preferably from 0.5 to 5% by weight, based on the weight of the non-magnetic powder for good runnability and output.

The fatty acid ester may also preferably be added in an amount of from 0.2 to 10% by weight, and preferably from 0.5 to 5% by weight, based on the weight of the non-magnetic powder for good runnability and output.

In the case when the fatty acid and the fatty acid ester are used in combination so that the lubricating effect can be increased, the fatty acid and the fatty acid ester may preferably be used in a weight ratio of from 10:90 to 90:10.

The fatty acid may be in the form of either a monobasic acid or a dibasic acid, and may preferably have a carbon atom number in the range of from 6 to 30, and preferably from 12 to 22.

The fatty acid may specifically include caproic acid, caprylic acid, captic acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pymelic acid, azelaic acid, sebacic acid, 1,12-dodecanedicarboxylic acid and octanedicarboxylic acid.

The fatty acid ester may specifically include oleyl oleate, isocetyl stearate, dioleyl maleate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, 2-ethyl hexyl palmitate, isopropyl palmitate, isopropyl myristate, butyl laurate, cetyl-2-ethyl hexanoate, diolelyl adipate, diethyl adipate, diisobutyl adipate, diisodecyl adipate, oleyl stearate, 2-ethylhexyl myristate, isopentyl palmitate, isopentyl stearate, and diethylene glycol monobutyl ether palmitate.

As lubricants other than the fatty acid and fatty acid ester described above, materials known in themselves can be used. For example, it is possible to use silicone oil, carbon fluoride, fatty acid amide, α-olefin oxide and so forth.

The durability improver may include polyisocyanates. The polyisocyanates are exemplified by an aromatic polyisocyanate such as an addition product of tolylene diisocyanate (TDI) with an active hydrogen compound, and an aliphatic polyisocyanate such as an addition product of hexamethylene diisocyanate (HMDI) with an active hydrogen compound. The polyisocyanate preferably have a weight average molecular weight in the range of from 100 to 3,000.

The dispersant may include aliphatic acids having 12 to 18 carbon atoms such as caprylic acid, capric acid, lauric acid, myristic acid, palmitic acid, stearic acid and oleic acid; alkali metal salts, alkaline earth metal salts or amides of any of these; polyalkylene oxide alkylphosphoric acid esters; lecithin; trialkylpolyolefinoxy quaternary ammonium salts; and azo compounds having a carboxyl group and a sulfonic acid group. These dispersants may usually be used in the range of from 0.5 to 5% by weight based on the weight of the non-magnetic powder.

The antistatic agent may include surface active agents such as quaternary amines, anionic surface active agents containing an acid group such as sulfonic acid, sulfuric acid, phosphoric acid, phosphate or carboxylic acid; and natural surface active agents such as saponin. The antistatic agent described above may usually be added in the range of from 0.01 to 40% by weight based on the weight of the binder.

In the present invention, a conductive fine powder may preferably be used as the antistatic agent. Such an antistatic agent may include metal particles such as carbon black, graphite, tin oxide, silver powder, silver oxide, silver nitrate, organic compounds of silver, and copper powder; and pigments comprised of metal oxides such as zinc oxide, barium sulfate and titanium oxide, coated with a conductive material such as tin oxide or antimony solid solution tin oxide.

The conductive fine powder may have an average particle diameter of from 5 to 700 nm, preferably from 5 to 200 nm, and more preferably from 5 to 50 nm.

The conductive fine powder may preferably be contained in an amount of from 1 to 20 parts by weight, and more preferably from 5 to 15 parts by weight, based on 100 parts by weight of the non-magnetic powder.

(C) Uppermost Layer Comprised of Magnetic Layer

(C-1) Surface of uppermost layer comprised of magnetic layer

The uppermost layer comprised of a magnetic layer may usually have a surface roughness $R_{10z}$ of 50 nm or less, preferably 30 nm or less, and particularly preferably from 5 to 20 nm. Good C/N ratio characteristics can be achieved when this surface roughness $R_{10z}$ is in the range of from 5 to 20 nm. Hence this range is more preferable.

Figure 1:
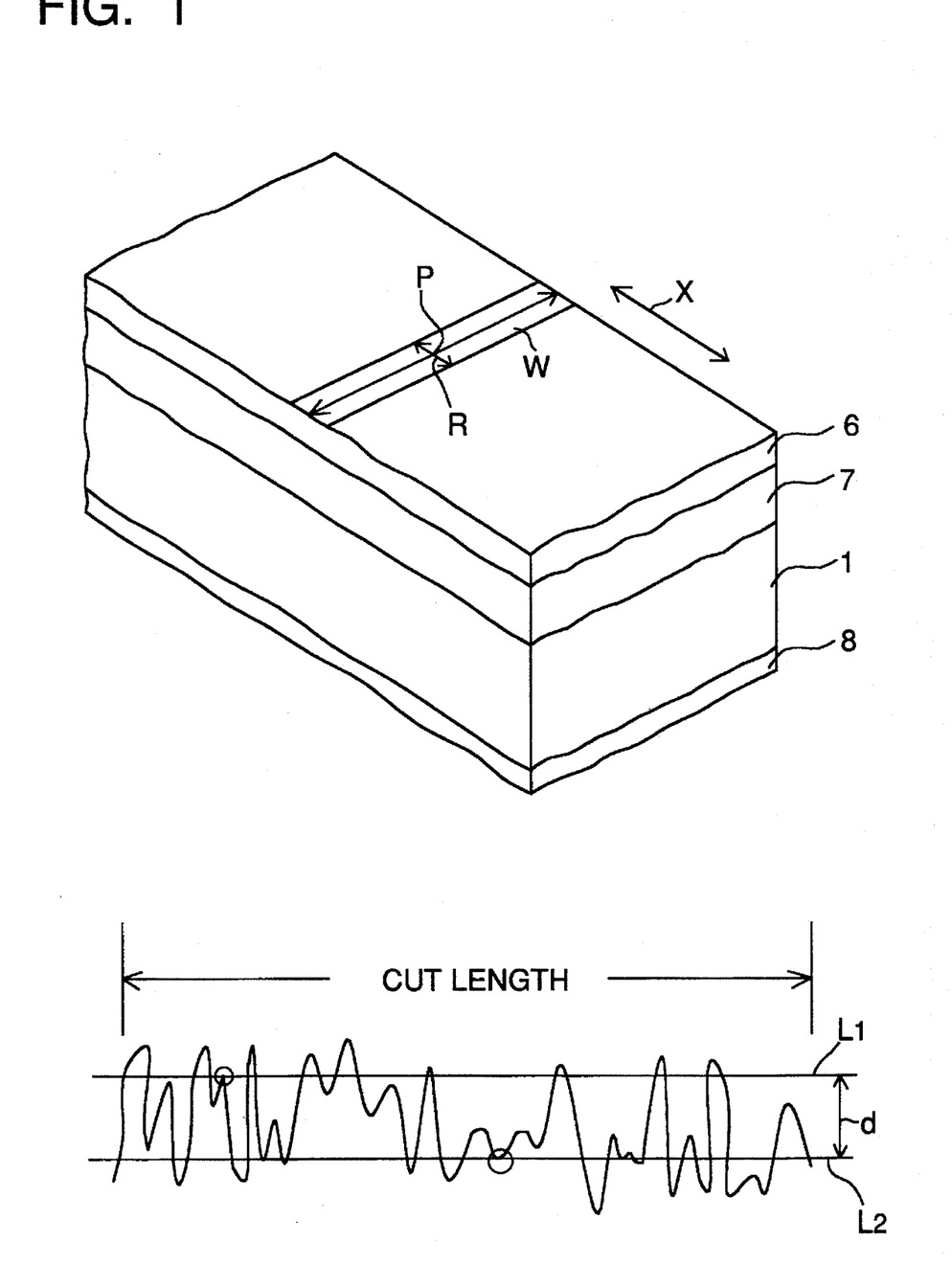
FIG. 1 illustrates a manner by which the surface roughness $R_{10z}$ of a magnetic layer is measured.

The surface roughness $R_{10z}$ refers to a value measured in the following manner: As shown in FIG. 1, a magnetic recording medium is vertically cut to obtain a cutting plane being central in the width direction (W) by a standard length in the longitudinal direction (X) including a point P within the range of ±2 mm (denoted by R in FIG. 1) from point P, where, among straight lines parallel to the horizontal line that crosses an external surface contour curve in the cutting plane, a straight line that passes the tenth lower peak ($L_1$) than the highest peak and a straight line that passes the tenth higher peak than the lowest bottom ($L_2$) are selected. A distance d between these two straight lines ($L_1$ and $L_2$) is measured to obtain the intended value $R_{10z}$.

The $R_{10z}$ can be measured using Talystep Roughness Meter (manufactured by Rank Taylor Hobson Corp.) under conditions of a stylus size of 2.5×0.1 μm, a stylus force of 2 mg, a cut-off filter frequency of 0.33 Hz, a measuring speed of 2.5 μm/sec and a standard length of 0.5 mm. In the roughness curve, unevenness of 0.002 μm or less is omitted.

The surface roughness $R_{10z}$ can be controlled, for example, by setting the calendering conditions in manufacturing steps to control the surface smoothness of the magnetic layer. That is, the factors as calendering conditions including temperature, linear pressure and C/S (coating speed) may be controlled. Other factors including the size and quantity of the particles added in the magnetic layer may be optionally controlled. The calendering conditions will be described later.

To achieve the object of the present invention, the calendering may usually be carried out under conditions of a temperature of from 50° to 140° C., a linear pressure of from 50 to 400 kg/cm and a C/S of from 20 to 1,000 m/min.

(C-2) Composition of uppermost layer comprised of a magnetic layer

The uppermost layer comprised of a magnetic layer contains a magnetic powder. The uppermost layer comprised of a magnetic layer may further contain a binder and other components.

(C-2-1) Magnetic Powder

The magnetic powder used in the present invention may include ferromagnetic iron oxide powder, ferromagnetic metal powder and hexagonal tabular powder.

Of these, the ferromagnetic metal powder detailed later can be preferably used.

The ferromagnetic iron oxide powder may include $\gamma$-$Fe_2O_3$, $Fe_3O_4$, or intermediate iron oxides of these, represented by $FeO_x$ ($1.33<x<1.5$), and those to which Co has been added (i.e., cobalt-modified), represented by Co—$FeO_x$ ($1.33<x<1.5$).

The ferromagnetic metal powder may include ferromagnetic metal powders exemplified by metal magnetic powders composed of Fe or Co, as well as those mainly composed of Fe, Ni or Co such as Fe—Al, Fe—Al—Ni, Fe—Al—Zn, Fe—Al—Co, Fe—Al—Ca, Fe—Ni, Fe—Ni—Al, Fe—Ni—Co, Fe—Ni—Si—Al—Mn, Fe—Ni—Si—Al—Zn, Fe—Al—Si, Fe—Ni—Zn, Fe—Ni—Mn, Fe—Ni—Si, Fe—Mn—Zn, Fe—Co—Ni—P and Ni—Co systems. Of these, Fe type metal powder has an excellent electrical characteristics.

On the other hand, from the viewpoint of corrosion resistance and dispersibility, Fe—Al type ferromagnetic metal powder comprising Fe and Al is preferred, including Fe—Al, Fe—Al—Ca, Fe—Al—Ni, Fe—Al—Zn, Fe—Al—Co, Fe—Ni—Si—Al—Co and Fe—Co—Al—Ca.

In particular, ferromagnetic metal powder preferable for what is intended in the present invention is a magnetic metal powder mainly composed of iron, containing Al or Al and Ca. In the case of Al, the weight ratio of Fe:Al should be in the range of from 100:0.5 to 100:20; and in the case of Ca, the weight Patio of Fe:Ca, from 100:0.1 to 100:10.

Controlling the ratio of Fe:Al within such a range can bring about a remarkable improvement in corrosion resistance. Controlling the ratio of Fe:Ca within such a range can bring about a remarkable improvement in electromagnetic conversion characteristics and a decrease in dropouts.

The reason why the improvement in electromagnetic conversion characteristics and decrease in dropouts can be brought about is not clear. It is presumed that they are due to an increase in coercive force and a decrease in agglomerates.

Besides what has been described above as the ferromagnetic metal powder, it is also possible to use a specific ferromagnetic metal powder containing as its component elements, Fe, Al and at least one rare earth element selected from the group consisting of Sm, Nd, Y and Pr, which belongs to Fe—Al type ferromagnetic metal powder.

Such a specific ferromagnetic metal powder may preferably be those in which Fe, Al and at least one rare earth element selected from the group consisting of Sm, Nd, Y and Pr are present in the whole composition in such a proportion that Al atoms are in an amount of from 2 to 10 parts by weight and at least one rare earth element selected from the group consisting of Sm, Nd, Y and Pr is in an amount of from 1 to 8 parts by weight, based on 100 parts by weight of Fe atoms, and also Fe, Al and at least one rare earth element selected from the group consisting of Sm, Nd, Y and Pr are present in the particle surfaces in such a proportion that Al is in an atom number of from 70 to 200 and at least one rare earth element selected from the group consisting of Sm, Nd, Y and Pr is in an atom number of from 0.5 to 30, based on 100 atom number of Fe.

The ferromagnetic metal powder may more preferably further contains Na and Ca as its component elements, in which Fe, Al, at least one rare earth element selected from the group consisting of Sm, Nd, Y and Pr and the additional Na and Ca are present in the whole composition in such a proportion that Al atoms are in an amount of from 2 to 10 parts by weight, at least one rare earth element selected from the group consisting of Sm, Nd, Y and Pr is in an amount of from 1 to 8 parts by weight, Na atoms are in an amount of less than 0.1 parts by weight and Ca atoms are in an amount of from 0.1 to 2 parts by weight, based on 100 parts by weight of Fe atoms, and also Fe, Al, at least one rare earth element selected from the group consisting of Sm, Nd, Y and Pr and the additional Na and Ca are present in the particle surfaces in such a proportion that Al is in an atom number of from 70 to 200, at least one rare earth element selected from the group consisting of Sm, Nd, Y and Pr is in an atom number of from 0.5 to 30, Na is in an atom number of from 2 to 30 and Ca is in an atom number of from 5 to 30, based on 100 atom number of Fe.

The ferromagnetic metal powder may still more preferably further contains Co, Ni and Si as its component elements, in which Fe, Co, Ni, Al, Si, at least one rare earth element selected from the group consisting of Sm, Nd, Y and Pr, Na and Ca are present in the whole composition in such a proportion that Co atoms are in an amount of from 2 to 20 parts by weight, Ni atoms are in an amount of from 2 to 20 parts by weight, Al atoms are in an amount of from 2 to 10 parts by weight, Si atoms are in an amount of from 0.3 to 5 parts by weight, at least one rare earth element selected from the group consisting of Sm, Nd, Y and Pr is in an amount of from 1 to 8 parts by weight, Na atoms are in an amount of less than 0.1 parts by weight and Ca atoms are in an amount of from 0.1 to 2 parts by weight, based on 100 parts by weight of Fe atoms, and also Fe, Co, Ni, Al, Si, at least one rare earth element selected from the group consisting of Sm, Nd, Y and Pr, Na and Ca are present in the particle surfaces in such a proportion that Co is in an atom number of less than 0.1, Ni is in an atom number of less than 0.1, Al is in an atom number of from 70 to 200, Si is in an atom number of from 20 to 130, at least one rare earth element selected from the group consisting of Sm, Nd, Y and Pr is in an atom number of from 0.5 to 30, Na is in an atom number of from 2 to 30 and Ca is in an atom number of from 5 to 30, based on 100 atom number of Fe.

The ferromagnetic metal powder in which Fe, Co, Ni, Al, Si, at least one rare earth element selected from the group consisting of Sm, Nd, Y and Pr, Na and Ca are present in the whole composition within the proportional range described above and also Fe, Co, Ni, Al, Si, at least one rare earth element selected from the group consisting of Sm, Nd, Y and Pr, Na and Ca are present in the particle surfaces within the proportional range described above is preferred since it can have a high coercive force (Hc) of 1,700 Oe or above, a high saturation magnetization ($\sigma_s$) of 120 emu/g or above and a high dispersibility.

This specific ferromagnetic metal powder may usually be contained in an amount of from 60 to 95% by weight, preferably from 70 to 90% by weight, and particularly preferably from 75 to 85% by weight, based on the total weight of solid contents in that layer.

In addition, the ferromagnetic powder preferably has the following structure: The content ratio of Fe atoms to Al atoms contained in the ferromagnetic powder is Fe:Al= 100:1 to 100:20 in atom number ratio, and the ratio of content of Fe atoms and Al atoms present in the surface region of 100 Å or less in the depth analyzed by ESCA (electron spectroscopy for chemical analysis) of the ferromagnetic powder is Fe:Al=30:70 to 70:30 in atom number ratio. The ferromagnetic powder may also include ferromagnetic powders having the following structure: Fe atoms, Ni atoms, Al atoms and Si atoms are contained in the ferromagnetic powder and also at least one of Co atoms and Ca atoms are contained in the ferromagnetic powder, where the Fe atoms are in a content of not less than 90 atom %, the Ni atoms in a content of not less than 1 atom % and less than 10 atom %, the Al atoms in a content of not less than 0.1 atom % and less than 5 atom %, the Si atoms in a content of not less than 0.1 atom % and less than 5 atom %, the Co atoms and/or Ca atoms in a content (or a total weight when both the Co atoms and the Ca atoms are contained) of not less than 0.1 atom % and less than 13 atom %, and the ratio of content of Fe atoms to Ni atoms, Al atoms, Si atoms, Co atoms and/or Ca atoms present in the surface region of 100 Å or less in the depth analyzed by ESCA of the ferromagnetic powder is Fe:Ni:Al:Si:(Co and/or Ca)=100:(4 or less) :(10 to 60):(10 to 70):(20 to 80) in atom number ratio.

The ferromagnetic powder used in the present invention may comprise particles having a major axis length of less than 0.30 µm or less, preferably from 0.10 to 0.20 µm, and more preferably from 0.10 to 0.17 µm. The ferromagnetic powder comprising particles having a major axis length within the above range can contribute an improvement in the surface properties of the magnetic recording medium and also an achievement of improved electrical characteristics.

The major axis length of the ferromagnetic powder is measured in the same way as in the non-magnetic powder.

In the present invention, the orientation percentage of the acicular ferromagnetic powder in the uppermost magnetic layer at its cross section parallel to the direction of tape run and perpendicular to the surface of the non-magnetic support is preferably not less than 55%, and particularly preferably not less than 60%. The magnetic layer can be smooth, can have a high packing density and can achieve a high calenderability when the stated orientation percentage is not less than 55%, in particular, not less than 60%.

The orientation percentage is herein meant to be the proportion of the acicular ferromagnetic powder oriented in the direction of −45° to 45°, to the whole acicular ferromagnetic powder.

In order to control the orientation percentage so as to be not less than 55%, a ferromagnetic layer coating composition should be applied in such a way that a force is applied to a ferromagnetic layer coating in the longitudinal direction of the non-magnetic support while adjusting the distance between the non-magnetic support and a coater die, coating speed, and the pressure at which the non-magnetic support is pressed against the coater die.

The orientation percentage can be measured according to what has been described in paragraph (B-2-1).

In the present invention, the major axis length (a) of the ferromagnetic powder contained in the magnetic layer and major axis length (b) of the non-magnetic powder contained in the lower layer non-magnetic layer is preferably in a ratio (axial ratio b/a) of 3 or less, more preferably 2.5 or less, and still more preferably 2 or less. When the axial ratio is within the stated rage, superior characteristics can be achieved such that the surface properties of the magnetic recording medium can be brought into a good state.

The ferromagnetic powder used in the present invention may preferably have a coercive force (Hc) of usually from 600 to 5,000 Oe to obtain the good electromagnetic conversion characteristics and recording.

The ferromagnetic powder may preferably have a saturation magnetization ($\sigma_s$), which is magnetic characteristics thereof, of usually 70 emu/g or more to obtain the good electromagnetic conversion characteristics. When this magnetic powder is the ferromagnetic metal powder, it should have a saturated magnetization of 120 emu/g or more.

In the present invention, it is also preferable to use a ferromagnetic metal powder having a specific surface area measured by the BET method, of 30 $m^2/g$ or more, and particularly 45 $m^2/g$ or more, as recording density is made higher. The specific surface area is preferably 100 $m^2/g$ or less, and more preferably 60 $m^2/g$ or less.

This specific surface area and its measuring method are detailed in J. M. Dallavelle and Clyeorr Jr., "Measurement of Powders", translated by Muta et al., Sangyo Tosho Co. They are also described in "KAGAKU BENRAN (Chemical Handbook)", the Volume of Application, pp. 1170–1171 (compiled by Japan Chemical Society; published by Maruzen Co., Ltd., Apr. 30, 1966).

The specific surface area is measured, for example, in the following way: Powder is deaerated while heated at about 105° C. for 13 minutes, to remove matter adsorbed to the powder. Thereafter, the powder thus treated is introduced into a measuring apparatus, where the initial pressure of nitrogen is set to be 0.5 kg/$m^2$ and the measurement is made for 10 minutes using nitrogen at liquid nitrogen temperature (−105° C.).

As the measuring apparatus, for example, Cuanta-Soap (manufactured by Yuasa Ionics Co.) may be used.

The hexagonal tabular powder may include, for example, hexagonal ferrites. Such hexagonal ferrites are exemplified by barium ferrite, strontium ferrite and so forth, whose Fe element may be partly substituted with other element as exemplified by Ti, Co, Zn, In, Mn, Ge or Hb. Such ferrite magnetic materials are detailed in IEEE trans on MAG-18 16(1982).

Of these, barium ferrite can be preferably used in the present invention.

The barium ferrite (hereinafter "Ba-ferrite") magnetic powder preferably used in the present invention can be exemplified by Ba-ferrite whose Fe is partly substituted with at least Co and Zn, and having an average particle diameter (the height of a diagonal line of the plate face of hexagonal ferrite particles) of from 400 to 900 Å, a plate ratio (the value obtained when the length of a hexagonal line of the plate face of hexagonal ferrite particles is divided by plate thickness) of from 2.0 to 10.0, and preferably from 2.0 to 6.0, and a coercive force (Hc) of from 450 to 1,500.

The Ba-ferrite powder has a coercive force having been controlled at a proper value since its Fe is partly substituted with Co, and, since its Fe is further partly substituted with Zn, has achieved a high saturation magnetization spectral sensitizer than can not be achieved if substituted only with Co. Thus it is possible to obtain a magnetic recording medium having superior electromagnetic conversion characteristics with a high reproduction output. The Fe may be further partly substituted with Nb, whereby it becomes possible to obtain a magnetic recording medium having superior electromagnetic conversion characteristics with a higher reproduction output. In the Ba-ferrite used in the present invention, the Fe may also be partly substituted with a transition metal such as Ti, In, Mn, Cu, Ge or Sn.

The Be-ferrite used in the present invention is represented by the formula:

$$BaO \cdot n[(Fe_{1-m}M_m)_2O_3]$$

wherein m is larger than 0.36 (provided that Co+Zn=0.08 to 0.3 and Co/Zn=0.5 to 10); n is 5.4 to 11.0, and preferably 5.4 to 6.0; and M represents a substituent metal, comprised of a combination of two or more elements whose average valence number is 3. Such magnetic particles are preferred.

In order to make reproduction output sufficient when the magnetic recording medium is set up, the Ba-ferrite may preferably have an average particle diameter of not smaller than 300 Å or more, and in order to improve surface smoothness and to lower noise level, it may preferably have an average particle diameter of not larger than 900 Å. Controlling the plate ratio to be 2.0 or more makes it possible to obtain a vertical orientation rate suited for high-density recording when the magnetic recording medium is set up. In order to improve surface smoothness and to lower noise level, the plate ratio may preferably be controlled to be 10.0 or less. Moreover, in order to retain recording signals, the coercive force may preferably be 450 Oe or more, and, in order to prevent a head from being saturated, may preferably be 1,500 Oe or less.

The average particle diameter is measured in the same manner as described in (B-2-1).

The Ba-ferrite used in the present invention may preferably have a saturation magnetization ($\sigma_s$), which is magnetic characteristics thereof, of usually 50 emu/g or more for the good electromagnetic conversion characteristics.

In the present invention, it is also preferable to use a Ba-ferrite magnetic powder having a specific surface area measured by the BET method, of 30 m²/g or more, as recording density is made higher.

The hexagonal magnetic powder used in the present invention can be prepared, for example, by glass crystallization, which is a process comprising melting oxides and carbonates of all elements necessary to form the desireded Ba-ferrite, together with a glass forming material as exemplified by boric acid, to give a melt, quenching the resulting melt to form a glass, and heating the glass at a given temperature to produce deposits of crystal powder of the desired Ba-ferrite, finally followed by heating to remove the glass component. Besides, it can be prepared by coprecipitation firing, hydrothermal synthesis, fluxing, alkoxide treatment or plasma jet spraying.

In the present invention, the magnetic powder described above may be contained in an amount of from 50 to 99% by weight, preferably from 60 to 99% by weight, and particularly preferably from 75 to 90% by weight, based on the weight of solid composition in the uppermost magnetic layer.

(C-2-2) Binder

The binder in the uppermost layer comprised of the magnetic layer includes the same as the one previously described in paragraph (B-2-2).

The binder in the uppermost layer comprised of the magnetic layer may usually be contained in an amount of from 10 to 40 parts by weight, preferably from 15 to 30 parts by weight, based on 100 parts by weight of the magnetic powder.

(C-2-3) Other Components

Other components the uppermost layer comprised of the magnetic layer may contain are the same as those previously described in paragraph (B-2-3).

The lubricant may preferably be contained in an amount of from 0.2 to 10% by weight, and more preferably from 0.5 to 5% by weight, based on the weight of the magnetic powder.

The dispersant may preferably be contained in an amount of from 0.5 to 5% by weight based on the weight of the magnetic powder.

The conductive fine powder may preferably be contained in an amount of from 1 to 20 parts by weight, and more preferably from 3 to 15 parts by weight, based on 100 parts by weight of the magnetic powder.

Layers other than those described in (B-2) and (C) may be constituted as known magnetic layer and non-magnetic layer.

Production of Magnetic Recording Medium

In the magnetic recording medium of the present invention, the non-magnetic layers and the magnetic layers may preferably be provided by what is called wet-on-wet coating, in which a layer coating composition is applied when the lower layer stands wet. This wet-on-wet coating can be carried out by a method appropriately selected from methods used for the manufacture of known plural-layer structure magnetic recording mediums.

For example, usually the non-magnetic layer or the magnetic powder, the binder, the lubricant, the abrasive, the antistatic agent and a solvent are kneaded to prepare a high-concentration non-magnetic or magnetic coating composition, subsequently the resulting high-concentration non-magnetic or magnetic coating composition is diluted to prepare a magnetic coating composition, and this coating composition is applied to the surface of the lower layer that stands wet.

The components constituting the magnetic layer may be kneaded and dispersed using various types of kneading-dispersing machines.

Such kneading-dispersing machines can be exemplified by a twin-roll mill, a three-roll mill, a ball mill, a pebble mill, a co-ball mill, a tron mill, a sand mill, a sand grinder, Szegveri attritor, a high impeller dispersion machine, a high-speed stone mill, a high-speed impact mill, a disper, a high-speed mixer, a homogenizer, an ultrasonic dispersion machine, an open kneader, a continuous kneader and a pressure kneader. Of these kneading-dispersing machines, kneading-dispersing machine capable of providing a power consumption load of 0.05 to 0.5 kW (per 1 kg of magnetic powder) are a pressure kneader, an open kneader, a continuous kneader, a twin-roll mill and a three-roll mill.

Figure 2:
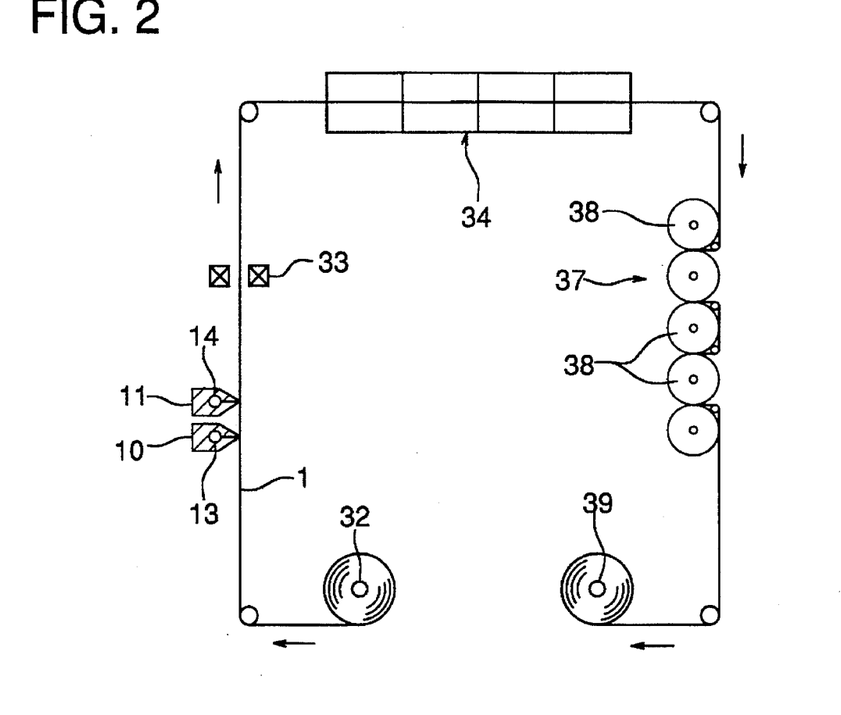
FIG. 2 illustrates double-layer coating of magnetic and non-magnetic layers by the wet-on-wet coating process.

The uppermost layer magnetic layer and the lower layer part can be formed on the non-magnetic support in the following way: Stated specifically, as shown in FIG. 2, on a non-magnetic support 1 fed from a feed roll 32, an uppermost layer coating composition and a lower layer coating composition are applied in double layers by wet-on-wet coating according to an extrusion system using extrusion coaters 10 and 11. Thereafter, the coated article is passed through an orienting magnet or vertically orienting magnet 33, and then led to a dryer 34, where hot air is blown from nozzles provided above and below to carry out drying. Next, the non-magnetic support 1 with dried coating layers is led to a super-calendering device 37 comprised of a combination of calender rolls 38, where it is calendered, and thereafter wound up on a wind-up roll 39. A magnetic film thus obtained is cut into tapes with the desired width. Thus, for example, 8 mm video camera magnetic recording tapes can be produced.

In the coating process described above, the coating compositions may be respectively fed to the extrusion coaters 10 and 11 through in-line mixers (not shown). In FIG. 2, arrows indicate the direction in which the non-magnetic support is transported. The extrusion coaters 10 and 11 are provided with liquid holders 13 and 14, respectively, where the respective coating compositions fed from the respective coaters are superposed by the wet-on-wet coating. That is, immediately after the lower layer coating composition has been applied (standing undried), the uppermost layer magnetic layer coating composition is superposingly applied.

Figure 3:
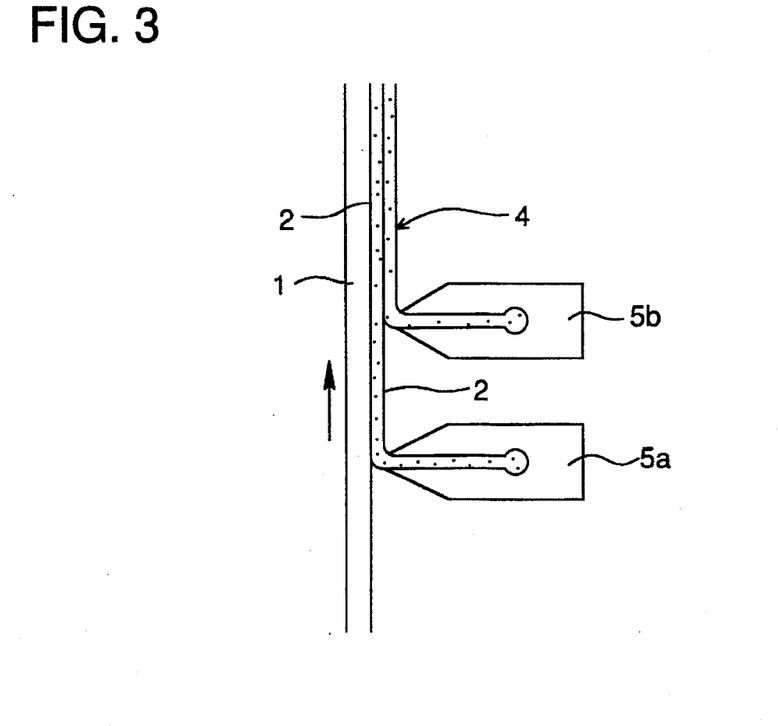
FIG. 3 illustrates an extrusion coater for coating magnetic and non-magnetic coating compositions.
Figure 4:
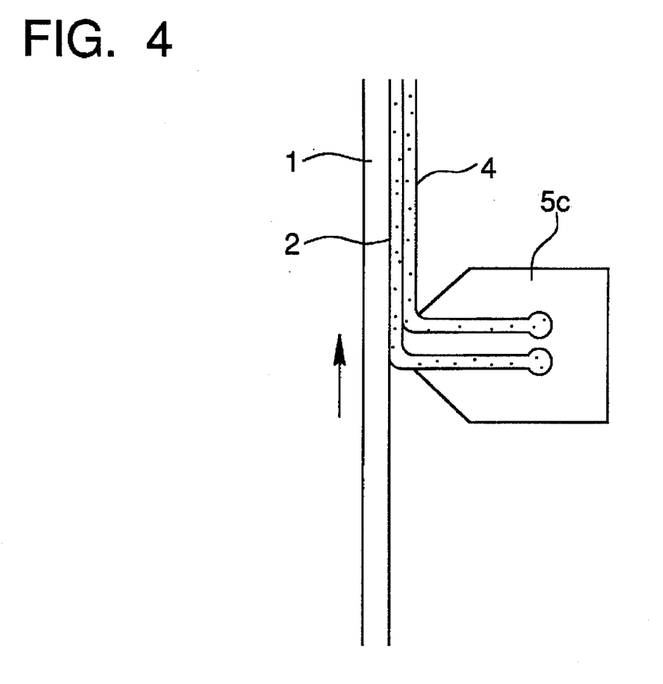
FIG. 4 illustrates another extrusion coater for coating magnetic and non-magnetic coating compositions.
Figure 5:
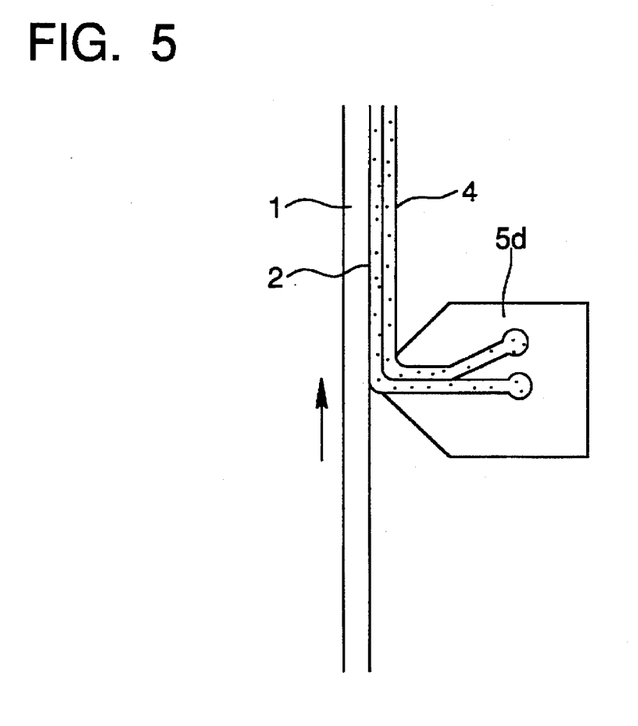
FIG. 5 illustrates still another extrusion coater for coating magnetic and non-magnetic coating compositions.

As the extrusion coaters, two-head extrusion coaters 5a and 5b as shown in FIG. 3 as well as extrusion coaters 5c and 5d of the types as shown in FIGS. 4 and 5 may also be used. Of these, the extrusion coater 5d shown in FIG. 5 is preferred in the present invention. Using the extrusion coater 5d, a lower layer coating composition 2 and an uppermost layer coating composition 4 are co-extruded so as to be applied in double layers.

As solvents mixed in the above coating compositions or diluting solvents used when the coating compositions are applied, it is possible to use ketones such as acetone, methyl ethyl ketone (MEK), methyl isobutyl ketone (MIBK) and cyclohexanone; alcohols such as methanol, ethanol, propanol and butanol; esters such as methyl acetate, ethyl acetate, butyl acetate, ethyl lactate and ethylene glycol monoacetate; ethers such as glycol dimethyl ether, glycol monoethyl ether, dioxane and tetrahydrofuran; aromatic hydrocarbons such as benzene, toluene and xylene; and halogenated hydrocarbons such as methylene chloride, ethylene chloride, carbon tetrachloride, chloroform and dichlorobenzene. Any of these various solvents may be used alone or in combination of two or more kinds.

The orienting magnet or vertically orienting magnet may have a magnetic field of from about 20 gauss to about 10,000 gauss. The drying using the dryer may be carried out at a temperature of from about 30° C. to about 120° C. and in a drying time of from about 0.1 to about 10 minutes.

The wet-on-wet coating may also be carried out in combination of a reverse roll with an extrusion coater, or combination of a gravure roll with an extrusion coater. Besides, an air doctor coater, a blade coater, an air knife coater, a squeeze coater, an impregnating coater, a transfer roll coater, a kiss coater, a cast coater, a spray coater or the like may be used in combination.

In the plural-layer coating according to this wet-on-wet coating, the uppermost magnetic layer coating composition is applied while the coating layer positioned beneath the uppermost layer stands wet, so that the surface of the lower layer, i.e., the boundary surface to the upper layer becomes smooth and also the surface properties of the upper layer are improved, and at the same time the adhesion between the upper and lower layers is improved. As a result, performances required for, e.g., magnetic tapes that must have a high output and a low noise particularly because of high-density recording can be satisfied. In addition, with regard to a demand for the performance of high durability, no film separation may occur and film strength can be improved, bringing about a satisfactory durability. Also, because of the wet-on-wet double-layer coating, dropouts can be decreased, so that the reliability can be improved.

Surface Smoothening

In the present invention, it is preferable to carry out surface smoothening by calendering.

Thereafter, a varnish treatment or blade treatment may optionally be carried out, followed by slitting.

In the surface smoothening, temperature, linear pressure, C/S (coating speed) can be given as calendaring conditions.

In the present invention, the above temperature, linear pressure and C/S may preferably be set to 50° to 140° C., 50 to 400 kg/cm, and 20 to 1,000 m/min, respectively.

The uppermost layer formed as a result of the treatment thus carried out may be made to have a thickness of 0.5 μm or less, and preferably from 0.1 to 0.4 μm.

EXAMPLES

Examples of the present invention will be described below.

Components, proportions and operational order shown below can be variously changed within the range falling under the scope of the present invention. In the following Examples, "part(s)" refers to "part(s) by weight" in all occurrences.

Examples 1 to 10 & Comparative Example 1 to 4

In Examples 1 to 10 and Comparative Example 1 to 4, the following components for an uppermost layer magnetic composition and the following components for a lower layer composition were respectively kneaded and dispersed using a kneader sand mill. Thus, an uppermost layer magnetic coating composition and a lower layer non-magnetic coating composition, respectively, were prepared.

| - Uppermost layer magnetic coating composition - | |
|---|---|
| Fe—Al ferromagnetic metal powder (Fe:Al atom number ratio: 100:4 (the whole); Fe:Al atom number ratio: 50:50 (the surface layer); average major axis length: as shown in Table 1; Hc: 1,760 Oe; BET specific surface area: 53 m²/g) | 100 parts |
| Vinyl chloride resin containing potassium sulfonate groups (MR-100; available from Nippon Zeon Co., Ltd.) | 10 parts |

-continued

| | |
|---|---|
| Polyurethane resin containing sodium sulfonate groups (UR-8700; available from Toyobo Co., Ltd.) | 10 parts |
| α-Alumina | 8 parts |
| Stearic acid | 1 part |
| Butyl stearate | 1 part |
| Cyclohexanone | 100 parts |
| Methyl ethyl ketone | 100 parts |
| Toluene | 100 parts |
| - Lower layer non-magnetic coating composition - | |
| Non-magnetic powder (as shown in Table 1) (Major axis length: as shown in Table 1; minor axis length: as shown in Table 1; axial ratio: as shown in Table 1; BET specific surface area: as shown in Table 1) | 100 parts |
| Vinyl chloride resin containing potassium sulfonate groups (MR-110; available from Nippon Zeon Co., Ltd.) | 12 parts |
| Polyurethane resin containing sodium sulfonate groups (UR-8700; available from Toyobo Co., Ltd.) | 8 parts |
| α-Alumina (average particle diameter: 0.2 μm) | 5 parts |
| Carbon black (average particle diameter: 15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

To each of the uppermost layer magnetic coating composition and lower layer non-magnetic coating composition thus obtained, 5 parts of polyisocyanate compound (Colonate L, trade name, available from Nippon Polyurethane Industry Co., Ltd.) was added.

Using the above uppermost magnetic layer coating composition containing the magnetic powder and the above non-magnetic layer coating composition containing the non-magnetic powder, wet-on-wet coating was carried out on a polyethylene terephthalate film with a thickness of 10 μm. Thereafter, the coatings were subjected to magnetic field orientation before they had been dried, and then dried, followed by surface smoothening by calandaring. In this way, lower layers and uppermost layers comprised of a magnetic layer were formed, each having the thickness as shown in Table 1.

On the side opposite to the magnetic layer side (i.e., the back), the polyethylene terephthalate film was coated with a coating composition having the following composition. The coating thus formed was dried, and then subjected to calandaring under the calandaring conditions previously described, to form a back coat layer with a thickness of 0.8 μm. In this way, broad raw-fabric magnetic tapes were obtained.

| | |
|---|---|
| Carbon black (Raven 1035) | 40 parts |
| Barium sulfate (average particle diameter: 300 nm) | 10 parts |
| Nitrocellulose | 25 parts |
| Polyurethane resin (N-2301, available from Nippon Polyurethane Industry Co., Ltd.) | 25 parts |
| Polyisocyanate compound (Colonate L, trade name, available from Nippon Polyurethane Industry Co., Ltd.) | 10 parts |
| Cyclohexanone | 400 parts |
| Methyl ethyl ketone | 250 parts |
| Toluene | 250 parts |

The raw-fabric magnetic tapes thus obtained were each slit to produce video magnetic recording mediums having a width of 8 mm. The following evaluation tests were made on the resulting magnetic recording mediums. Results obtained are shown in Table 1.

- Surface roughness $R_{10z}$ -

Measured using Talystep Roughness Meter (manufactured by Rank Taylor Hobson Corp.) Measured under conditions of a stylus size of 2.5 × 0.1 μm, a stylus force of 2 mg, a cut-off filter frequency of 0.33 Hz, a measuring speed of 2.5 μm/sec and a standard length of 0.5 mm. In the roughness curve, unevenness of 0.002 μm or less was omitted.
- Electrical characteristics (dB), RF output -

RF output at 7 MHz and 10 MHz was Measured using an eight mm video camera CCDV-900, manufactured by Sony Corp.
- Running durability -

Repeated running durability in an environment of temperature 40° C. and humidity 20% was evaluated as follows:
A: No trouble.
B: Scratches occurred on the back.
C: Runnable, but as many as 50 or more dropouts occurred.
D: Runnable, but resulting in a lowering of electrical characteristics by 2 dB or more.
E: Running stopped.
- Output difference after 100-pass running -

RF output difference at 7 MHz was measured.

TABLE 1(A)

| | | Lower layer | | | | | | |
|---|---|---|---|---|---|---|---|---|
| | | Non-magnetic powder | | | | | | |
| | Layer thickness (μm) | Kind | (1) b (μm) | (2) (μm) | Axial ratio | (3) (m²/g) | Treated with | |
| | | | | | | | Si (wt. %)* | Al |
| Example: | | | | | | | | |
| 1 | 2.0 | α-Fe₂O₃ | 0.48 | 0.06 | 8 | 35 | — | — |
| 2 | 1.5 | α-Fe₂O₃ | 0.27 | 0.03 | 9 | 40 | — | — |
| 3 | 1.0 | α-Fe₂O₃ | 0.18 | 0.01 | 18 | 60 | 0.6 | — |
| 4 | 1.0 | α-Fe₂O₃ | 0.12 | 0.02 | 6 | 75 | — | 0.3 |
| 5 | 1.5 | α-Fe₂O₃ | 0.10 | 0.01 | 10 | 85 | 0.3 | 0.3 |
| 6 | 0.4 | α-FeOOH | 0.18 | 0.03 | 6 | 120 | 0.5 | 0.5 |

TABLE 1(A)-continued

| | Lower layer | | | | | | | |
|---|---|---|---|---|---|---|---|---|
| | | Non-magnetic powder | | | | | | |
| | Layer thick- | | (1) | | | | Treated with | |
| | ness (μm) | Kind | b (μm) | (2) (μm) | Axial ratio | (3) (m²/g) | Si (wt. %)* | Al |
| 7 | 0.3 | α-FeOOH | 0.10 | 0.01 | 10 | 200 | 0.2 | 0.4 |
| 8 | 0.5 | α-FeOOH | 0.08 | 0.004 | 20 | 250 | 0.5 | 1.0 |
| 9 | 1.0 | $Cr_2O_3$ | 0.25 | 0.05 | 5 | 10 | — | — |
| 10 | 1.0 | $TiO_2$ | 0.30 | 0.03 | 10 | 12 | 1.0 | 1.5 |
| Comparative Example: | | | | | | | | |
| 1 | 1.0 | $α-Fe_2O_3$ | 0.18 | 0.18 | 1 | 15 | — | — |
| 2 | 1.0 | α-FeOOH | 0.20 | 0.20 | 1 | 35 | — | — |
| 3 | 1.5 | $Cr_2O_3$ | 0.25 | 0.25 | 1 | 8 | — | — |
| 4 | 1.0 | $TiO_2$ | 0.22 | 0.22 | 1 | 6 | — | — |

(1) Major axis length
(2) Minor axis length
(3) Specific surface area
*weight % based on the weight of the non-magnetic powder

TABLE 1(B)

| | Upper layer | | | | Results | | | |
|---|---|---|---|---|---|---|---|---|
| | Layer thick- | | (1) | | (2) | Output at | | |
| | ness (μm) | Ferromagnetic powder | a (μm) | b/a | $R_{10z}$ (μm) | 7 MHz (dB) | 10 MHz (dB) | (3) | (4) (dB) |
| Example: | | | | | | | | |
| 1 | 0.2 | Fe—Al | 0.16 | 3.0 | 18 | 1.5 | 2.0 | A | −1.0 |
| 2 | 0.5 | Fe—Al | 0.18 | 1.5 | 13 | 2.5 | 2.5 | A | −0.5 |
| 3 | 0.3 | Fe—Al | 0.16 | 1.1 | 16 | 2.0 | 2.5 | A | −0.5 |
| 4 | 0.2 | Fe—Al | 0.14 | 0.9 | 13 | 2.5 | 3.0 | A | −0.5 |
| 5 | 0.15 | Fe—Al | 0.12 | 0.8 | 11 | 3.5 | 4.5 | A | −1.0 |
| 6 | 0.2 | Fe—Al | 0.20 | 0.9 | 14 | 3.0 | 4.5 | A | −0.5 |
| 7 | 0.2 | Fe—Al | 0.10 | 1.0 | 10 | 3.5 | 4.5 | A | −0.3 |
| 8 | 0.2 | Fe—Al | 0.08 | 1.0 | 9 | 4.0 | 5.0 | A | −0.0 |
| 9 | 0.3 | Fe—Al | 0.15 | 1.7 | 18 | 1.5 | 2.0 | A | +0.5 |
| 10 | 0.2 | Fe—Al | 0.15 | 2.0 | 19 | 1.5 | 2.0 | A | 0.0 |
| Comparative Example: | | | | | | | | |
| 1 | 0.5 | Fe—Al | 0.16 | — | 25 | 0.0 | 0.0 | E | — |
| 2 | 0.3 | Fe—Al | 0.16 | — | 30 | −2.0 | −1.0 | D | −4.0 |
| 3 | 0.2 | Fe—Al | 0.16 | — | 22 | −0.5 | +0.5 | C | −2.5 |
| 4 | 0.4 | Fe—Al | 0.16 | — | 24 | −1.0 | 0.0 | C | −2.5 |

(1) Major axis length
(2) Surface roughness
(3) Runnability at 40° C., 20% RH
(4) Output difference after 100-pass running As described above, the present invention can provide a magnetic recording medium suitable for digital recording mediums, having good surface properties and having superior electrical characteristics and runnability.

Examples 11 to 17 & Comparative Examples 5 to 8

In Examples 11 to 17, the following components for an uppermost layer magnetic composition and the following components for a lower layer composition were kneaded and dispersed using a kneader sand mill. Thus, the uppermost layer magnetic coating composition and the lower layer non-magnetic coating composition, respectively, were prepared.

| - Uppermost layer magnetic coating composition - | |
|---|---|
| Fe—Al ferromagnetic metal powder (Fe:Al atom number ratio: 100:4 (the whole); Fe:Al atom number ratio: 50:50 (the surface layer); average major axis length: as shown in Table 2; axial ratio 'average major axis length/average minor axis length': as shown in Table 2; Hc: 1,730 Oe; BET specific surface area: 51 m²/g) | 100 parts |
| Vinyl chloride resin containing potassium sulfonate groups (MR-110; available from Nippon Zeon Co., Ltd.) | 9 parts |
| Polyurethane resin containing sodium sulfonate groups (UR-8700; available from Toyobo Co., Ltd.) | 9 parts |

-continued

| | |
|---|---|
| α-Alumina (average particle diameter: 0.17 μm) | 8 parts |
| Stearic acid | 1 part |
| Butyl stearate | 1 part |
| Cyclohexanone | 100 parts |
| Methyl ethyl ketone | 100 parts |
| Toluene | 100 parts |

- Lower layer non-magnetic coating composition -

| | |
|---|---|
| Non-magnetic powder xas shown in Table 2 (average major axis length: as shown in Table 2; average minor axis length: as shown in Table 2; axial ratio: as shown in Table 2; BET specific surface area: as shown in Table 2) | 100 parts |
| Vinyl chloride resin containing potassium sulfonate groups (MR-110; available from Nippon Zeon Co., Ltd.) | 12 parts |
| Polyurethane resin containing sodium sulfonate groups (UR-8700; available from Toyobo Co., Ltd.) | 8 parts |
| α-Alumina (average particle diameter: 0.2 μm) | 5 parts |
| Carbon black (average particle diameter: 15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

To each of the uppermost layer magnetic coating compositions and lower layer non-magnetic coating compositions thus obtained, 5 parts of polyisocyanate compound (Colonate L, trade name, available from Nippon Polyurethane Industry Co., Ltd.) was added.

With regard to Comparative Examples 5 to 8, uppermost layer magnetic coating compositions and lower layer non-magnetic coating compositions were prepared in the same manner as in Examples 11 to 17, using the ferromagnetic powder and non-magnetic powder as shown in Table 2, provided that Comparative Examples 6 and 7 are in the scope of the invention.

Using the above magnetic layer coating composition and the above non-magnetic layer coating composition containing the non-magnetic powder, wet-on-wet coating was carried out on a polyethylene terephthalate film with a thickness of 10 μm. Thereafter, the coatings were subjected to magnetic field orientation before they had been dried, and then dried, followed by surface smoothening by calendering. In this way, lower layers and uppermost layers comprised of a magnetic layer were formed, each having the thickness as shown in Table 2.

On the side opposite to the magnetic layer side (i.e., the back), the polyethylene terephthalate film was coated with a coating composition having the following composition. The coating thus formed was dried, and then subjected to calendering under the calendering conditions previously described, to form a back coat layer with a thickness of 0.3 μm. In this way, broad raw-fabric magnetic tapes were obtained.

| | |
|---|---|
| Carbon black (Raven 1035) | 40 parts |
| Barium sulfate (average particle diameter: 300 nm) | 10 parts |
| Nitrocellulose | 25 parts |
| Polyurethane resin (N-2301, available from Nippon Polyurethane Industry Co., Ltd.) | 25 parts |
| Polyisocyanate compound (Colonate L, trade name, available from Nippon Polyurethane Industry Co., Ltd.) | 10 parts |

-continued

| | |
|---|---|
| Cyclohexanone | 400 parts |
| Methyl ethyl ketone | 250 parts |
| Toluene | 250 parts |

The raw-fabric magnetic tapes thus obtained were each slit to produce video magnetic recording mediums having a width of 8 mm. The following evaluation tests were made on the resulting magnetic recording mediums. Results obtained are shown in Table 2.

- Surface roughness $R_{10z}$ -

Measured using Talystep Roughness Meter (manufactured by Rank Taylor Hobson Corp.).

Measured under conditions of a stylus size of 2.5 ×

0.1 μm, a stylus force of 2 mg, a cut-off filter frequency of 0.33 Hz, a measuring speed of 2.5 μm/sec and a standard length of 0.5 mm.

In the roughness curve, unevenness of 0.002 μm or less was omitted.

- Running durability at a low temperature -

A tape was made to run for full length at a temperature of 0° C., using S-550 (produced by Sony Corporation). The frequency the lowering of RF output occurred by 2 dB or more and for 1 second or more was counted as head clogging.

TABLE 2(A)

| | Upper layer Ferromagnetic powder | | |
|---|---|---|---|
| | Kind | Major axis length a (μm) | Axial ratio |
| Example: | | | |
| 11 | Fe—Al | 0.16 | 8 |
| 12 | Fe—Al | 0.10 | 6 |
| 13 | Fe—Al | 0.15 | 7 |
| 14 | Fe—Al | 0.15 | 5 |
| 15 | Fe—Al | 0.25 | 8 |
| 16 | Fe—Al | 0.20 | 9 |
| 17 | Fe—Al | 0.14 | 10 |
| Comparative Example: | | | |
| 5 | Fe—Ni | 0.18 | 8 |
| 6 | Fe—Al | 0.30 | 8 |
| 7 | Fe—Al | 0.20 | 8 |
| 8 | Fe—Al | 0.16 | 6 |

TABLE 2(B)

| | | Lower layer Non-magnetic powder | | | | | | |
|---|---|---|---|---|---|---|---|---|
| | | Major axis length b | Minor axis length | Ax- ial | (1) | Treated with | | (2) |
| | Kind | (μm) | (μm) | ratio | (m²/g) | Si | Al | (%) |
| Example: | | | | | | | | |
| 11 | α-Fe₂O₃ | 0.24 | 0.03 | 8 | 36 | No | No | 55 |
| 12 | α-Fe₂O₃ | 0.30 | 0.02 | 15 | 5 | No | No | 65 |
| 13 | α-Fe₂O₃ | 0.20 | 0.01 | 20 | 70 | No | Yes | 70 |
| a14 | α-FeOOH | 0.15 | 0.01 | 15 | 245 | Yes | No | 60 |
| 15 | Cr₂O₃ | 0.50 | 0.10 | 5 | 12 | No | No | 45 |
| 16 | TiO₂ | 0.40 | 0.20 | 2 | 50 | No | No | 40 |
| 17 | α-Fe₂O₃ | 0.28 | 0.04 | 7 | 40 | Yes | Yes | 55 |
| Comparative Example: | | | | | | | | |
| 5 | α-Fe₂O₃ | 0.36 | 0.36 | 1 | 10 | No | No | 5 |
| 6 | Cr₂O₃ | 0.30 | 0.10 | 3 | 8 | No | No | 20 |
| 7 | α-Fe₂O₃ | 0.20 | 0.04 | 5 | 35 | No | No | 35 |
| 8 | — | — | — | — | — | — | — | — |

(1): BET surface specific area
(2): Orientation percentage measured by the measuring method-1

TABLE 2(C)

| | b/a | $R_{10z}$ (nm) | Upper/lower layer thick-ness (μm) | Results Runnability at 0° C. |
|---|---|---|---|---|
| Example: | | | | |
| 11 | 1.5 | 15 | 0.2/1.5 | 0 |
| 12 | 3.0 | 20 | 0.2/1.0 | 0 |
| 13 | 1.3 | 13 | 0.5/1.0 | 0 |
| 14 | 1.0 | 12 | 0.3/1.5 | 0 |
| 15 | 2.0 | 18 | 0.4/1.7 | 0 |
| 16 | 2.0 | 14 | 0.3/1.5 | 0 |
| 17 | 2.0 | 19 | 0.2/0.4 | 0 |
| Comparative Example: | | | | |
| 5 | 2.0 | 25 | 0.3/2.0 | 5 |
| 6 | 1.0 | 28 | 0.5/2.0 | 3 |
| 7 | 1.0 | 29 | 0.3/2.0 | 2 |
| 8 | — | 35 | 0.2 | 9 |

As shown in Table 2, when the orientation percentage of the non-magnetic powder in the lower layer is not less than 40%, runnability at low temperature is improved.

Examples 18 to 21 &
Comparative Examples 9 to 11

In Examples 18 to 21, the following components for an uppermost layer magnetic composition and the following components for a lower layer composition were kneaded and dispersed using a kneader sand mill. Thus, the uppermost layer magnetic coating composition and the lower layer non-magnetic coating composition, respectively, were prepared.

- Uppermost layer magnetic coating composition -

| | |
|---|---|
| Ferromagnetic metal powder shown in Table 3 | 100 parts |
| Fe—Al ferromagnetic metal powder: | |
| Fe:Al atom number ratio: 100:4 (the whole); Fe:Al | |
| atom number ratio: 50:50 (the surface layer) | |
| Fe—Al—Nd ferromagnetic metal powder: | |
| Fe:Al:Nd atom number ratio: 100:4:4 (the whole); | |
| Fe:Al:Nd atom number ratio: 50:50:7.5 (the surface layer); average major axis length: as shown in Table 3; axial ratio (as previously described): as shown in Table 3; Hc: 1,900 Oe; BET specific surface area: 55 m²/g) | |
| Vinyl chloride resin containing potassium sulfonate groups | 9 parts |
| (MR-110; available from Nippon Zeon Co., Ltd.) | |
| Polyurethane resin containing sodium sulfonate groups (UR-8700; available from Toyobo Co., Ltd.) | 9 parts |
| α-Alumina (average particle diameter: 0.17 μm) | 8 parts |
| Stearic acid | 1 part |
| Butyl stearate | 1 part |
| Cyclohexanone | 100 parts |
| Methyl ethyl ketone | 100 parts |
| Toluene | 100 parts |

- Lower layer non-mipgnetic coating composition -

| | |
|---|---|
| Non-magnetic powder as shown in Table 3 (average major axis length: as shown in Table 3; average minor axis length: as shown in Table 3; axial ratio: as shown in Table 3; BET specific surface area: as shown in Table 3; Si treatment: % by weight of Si based on the total weight of the powder is shown in Table 3; Al treatment: % by weight of Al based on the total weight of the powder is shown in Table 3) | 100 parts |
| Vinyl chloride resin containing potassium sulfonate groups (MR-110; available from Nippon Zeon Co., Ltd.) | 12 parts |
| Polyurethane resin containing sodium sulfonate groups (UR-8700; available from Toyobo Co., Ltd.) | 8 parts |
| α-Alumina (average particle diameter: 0.2 μm) | 5 parts |
| Carbon black (average particle diameter: 15 nm) | 10 parts |
| Stearic acid | 1 part |
| Butyl stearate | 1 part |
| Cyclohexanone | 100 parts |
| Methyl ethyl ketone | 100 parts |
| Toluene | 100 parts |

To each of the uppermost layer magnetic coating compositions and lower layer non-magnetic coating composition thus obtained, 5 parts of polyisocyanate compound (Colonate L, trade name, available from Nippon Polyurethane Industry Co., Ltd.) was added.

With regard to Comparative Examples 9 to 11, uppermost layer magnetic coating compositions and lower layer non-magnetic coating compositions were prepared in the same manner as in Examples 18 to 21, using the ferromagnetic powder and non-magnetic powder as shown in Table 3, provided that Comparative Examples 9 to 11 are in the scope of the invention.

Using the above magnetic layer coating composition and the above non-magnetic layer coating composition containing the non-magnetic powder, wet-on-wet coating was carried out on a polyethylene terephthalate film with a thickness of 10 μm. Thereafter, the coatings were subjected to magnetic field orientation before they had been dried, and then dried, followed by surface smoothening by calendering. In this way, lower layers and uppermost layers comprised of a magnetic layer were formed, each having the thickness as shown in Table 3.

On the side opposite to the magnetic layer side (i.e., the back), the polyethylene terephthalate film was coated with a coating composition in the same manner as in Examples 18 to 21, to form a back coat layer with a thickness of 0.3 μm. In this way, broad raw-fabric magnetic tapes were obtained.

Evaluation tests were made in the same manner as previously described. Results obtained are shown in Table 3.

TABLE 3(A)

| | Upper layer Ferromagnetic powder | | | |
|---|---|---|---|---|
| | Kind | Major axis length a (μm) | Axial ratio | Orientation percentage (%) |
| Example: | | | | |
| 18 | Fe—Al | 0.15 | 8 | 55 |
| 19 | Fe—Al—Nd | 0.10 | 9 | 60 |
| 20 | Fe—Al—Nd | 0.12 | 8 | 70 |
| 21 | Fe—Al—Nd | 0.07 | 10 | 80 |
| Comparative Example: | | | | |
| 9 | Fe—Al | 0.15 | 7 | 55 |
| 10 | Fe—Al | 0.20 | 8 | 45 |
| 11 | Fe—Al—Nd | 0.12 | 6 | 70 |

TABLE 3(B)

| | Lower layer Non-magnetic powder | | | | | | | |
|---|---|---|---|---|---|---|---|---|
| | Kind | Major axis length a (μm) | Minor axis breadth | Axial ratio | (1) (m²/g) | Treated with Si | Al | (2) (%) |
| Example: | | | | | | | | |
| 18 | α-Fe₂O₃ | 0.15 | 0.02 | 7.5 | 53 | 0.7 | 0.2 | 50 |
| 19 | α-Fe₂O₃ | 0.12 | 0.02 | 6 | 60 | 0.5 | 0.5 | 60 |
| 20 | α-Fe₂O₃ | 0.12 | 0.02 | 6 | 60 | 0.5 | 0.5 | 60 |
| 12 | α-Fe₂O₃ | 0.07 | 0.01 | 7 | 65 | 0.7 | 0.2 | 65 |
| Comparative Example: | | | | | | | | |
| 9 | α-Fe₂O₃ | 0.20 | 0.04 | 5 | 35 | — | — | 40 |
| 10 | α-Fe₂O₃ | 0.20 | 0.05 | 4 | 30 | 0.3 | 0.3 | 50 |
| 11 | α-Fe₂O₃ | 0.12 | 0.02 | 6 | 35 | — | — | 40 |

(1): BET surface specific area
(2): Orientation percentage measured by the measuring method-1

TABLE 3(C)

| | b/a | $R_{10z}$ (nm) | Upper/lower layer thickness (μm) | Results Runnability at 0° C. |
|---|---|---|---|---|
| Example: | | | | |
| 18 | 1.0 | 16 | 0.15/1.5 | 0 |
| 19 | 1.2 | 13 | 0.2/1.8 | 0 |
| 20 | 1.2 | 12 | 0.2/1.5 | 0 |
| 21 | 1.0 | 11 | 0.2/1.5 | 0 |
| Comparative Example: | | | | |
| 9 | 1.3 | 18 | 0.3/1.7 | 2 |
| 10 | 1.0 | 20 | 0.3/1.7 | 3 |
| 11 | 1.0 | 25 | 0.2/1.7 | 2 |

As shown in Table 3, when the orientation percentage of the non-magnetic powder in the lower layer at its cross section parallel to the direction of tape run and perpendicular to the surface of the support is not less than 50%, also runnability at low temperature is improved.

What is claimed is:

1. A magnetic recording medium comprising:

a support, having provided thereon, a non-magnetic layer, said non-magnetic layer containing an acicular non-magnetic powder, said acicular non-magnetic powder having an average major axis length of 0.5 μm or less, an average minor axis length of 0.1 μm or less, and a ratio of said average major axis length to said average minor axis length of 2:1 to 20:1; and a magnetic layer provided on said magnetic layer, said magnetic layer containing a ferromagnetic metal powder comprising Fe and Al, said ferromagnetic metal powder having an average major axis length of less than 0.3 μm.

2. The medium of claim 1, wherein a surface of said non-magnetic powder is treated with a silicon compound or an aluminium compound.

3. The medium of claim 1, wherein said non-magnetic powder has a specific surface area of 10 to 250 m²/g.

4. The medium of claim 1, wherein said ferromagnetic metal powder has an average major axis length of 0.1 to 0.17 μm.

5. The medium of claim 1, wherein a ratio of an average major axis length of said non-magnetic powder to an average major axis length of said ferromagnetic metal powder is not more than 3.

6. The medium of claim 1, wherein a weight ratio of Fe to Al in said ferromagnetic powder is 100:0.5 to 100:20.

7. The medium of claim 1, wherein an atom number ratio of Fe to Al in said ferromagnetic metal powder is 100:1 to 100:20.

8. The medium of claim 1, wherein said non-magnetic powder is selected from the group consisting of carbon black, $CaCO_3$, $TiO_2$, barium sulfate, $\alpha\text{-}Al_2O_3$, $\alpha\text{-}Fe_2O_3$, $\alpha\text{-}FeOOH$ and $Cr_2O_3$.

9. The medium of claim 1, wherein an orientation percentage of said non-magnetic powder in said non-magnetic layer is not less than 40%.

10. The medium of claim 1, wherein an orientation percentage of said non-magnetic powder in said non-magnetic layer at its cross section in a longitudinal direction of said medium is not less than 50%.

11. The medium of claim 1 wherein said average major axis length of said acicular non-magnetic powder is 0.48 to 0.08 μm.

12. The medium of claim 1 wherein said average minor axis length of said acicular non-magnetic powder is 0.06 to 0.004 μm.

13. The medium of claim 1 wherein said average major axis length of said ferromagnetic metal powder is 0.2 to 0.08 μm.

14. The medium of claim 10, wherein an orientation percentage of said ferromagnetic metal powder in said uppermost magnetic layer at its cross section in a longitudinal direction of said medium is not less than 55%.

* * * * *

UNITED STATES PATENT AND TRADEMARK OFFICE
CERTIFICATE OF CORRECTION

PATENT NO. : 5,637,390
DATED : June 10, 1997
INVENTOR(S) : Ryousuki Isobe et al.

It is certified that error appears in the above-indentified patent and that said Letters Patent is hereby corrected as shown below:

Column 27, line 32 (claim 1), change "magnetic" (second instance) to --non-magnetic--.

Signed and Sealed this

Second Day of December, 1997

Attest:

BRUCE LEHMAN

*Attesting Officer*      *Commissioner of Patents and Trademarks*